(12) United States Patent
Takahashi et al.

(10) Patent No.: US 9,242,634 B2
(45) Date of Patent: Jan. 26, 2016

(54) CONTROL DEVICE FOR HYBRID VEHICLE

(71) Applicants: Satoru Takahashi, Nisshin (JP);
Takeshi Miyagawa, Toyokawa (JP);
Noritaka Nakajima, Toyota (JP); Kouki Kawamoto, Nisshin (JP); Daiki Sato, Toyota (JP); Masato Nakano, Toyota (JP); Akihiro Sato, Nagoya (JP); Takeshi Kanayama, Toyota (JP);
Shinichiro Suenaga, Susono (JP)

(72) Inventors: Satoru Takahashi, Nisshin (JP);
Takeshi Miyagawa, Toyokawa (JP);
Noritaka Nakajima, Toyota (JP); Kouki Kawamoto, Nisshin (JP); Daiki Sato, Toyota (JP); Masato Nakano, Toyota (JP); Akihiro Sato, Nagoya (JP); Takeshi Kanayama, Toyota (JP);
Shinichiro Suenaga, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/005,668

(22) PCT Filed: Nov. 30, 2012

(86) PCT No.: PCT/JP2012/081199
§ 371 (c)(1),
(2) Date: Sep. 17, 2013

(87) PCT Pub. No.: WO2014/083706
PCT Pub. Date: Jun. 5, 2014

(65) Prior Publication Data
US 2015/0258976 A1    Sep. 17, 2015

(51) Int. Cl.
*B60L 9/00* (2006.01)
*B60K 1/02* (2006.01)
*B60W 20/00* (2006.01)
*B60K 6/445* (2007.10)
(Continued)

(52) U.S. Cl.
CPC ............... *B60W 20/00* (2013.01); *B60K 6/445* (2013.01); *B60W 10/06* (2013.01); *B60W 10/08* (2013.01); *B60W 10/10* (2013.01); *B60W 10/12* (2013.01); *F02D 29/02* (2013.01); *F02D 41/0087* (2013.01); *B60W 2710/0672* (2013.01); *B60W 2710/083* (2013.01); *B60W 2710/12* (2013.01); *B60Y 2300/435* (2013.01); *F02D 23/00* (2013.01); *F02D 2250/18* (2013.01); *F02D 2250/21* (2013.01); *Y02T 10/6239* (2013.01); *Y02T 10/6286* (2013.01); *Y10S 903/902* (2013.01)

(58) Field of Classification Search
USPC .................................................. 701/22; 477/3
See application file for complete search history.

(56) References Cited

U.S. PATENT DOCUMENTS

| 5,967,940 A | 10/1999 | Yamaguchi |
| 7,272,484 B1 * | 9/2007 | Maeda et al. ................. 701/102 |

(Continued)

FOREIGN PATENT DOCUMENTS

| JP | A-9-100853 | 4/1997 |
| JP | A-11-93725 | 4/1999 |

(Continued)

*Primary Examiner* — Thomas G Black
*Assistant Examiner* — Tyler Paige
(74) *Attorney, Agent, or Firm* — Oliff PLC

(57) ABSTRACT

The control device of the present invention causes an engine to perform both partial cylinder operation and also all-cylinder operation, and moreover changes the operating point of the engine when the motor torque of a second motor-generator enters into operating point changeover ranges R1 and R2. The operating point changeover range R2 when the engine is performing partial cylinder operation is set to be wider, as compared to the operating point changeover range R1 when the engine is performing all-cylinder operation.

5 Claims, 8 Drawing Sheets

(51) Int. Cl.
*B60W 10/06* (2006.01)
*B60W 10/08* (2006.01)
*F02D 29/02* (2006.01)
*F02D 41/00* (2006.01)
*B60W 10/10* (2012.01)
*B60W 10/12* (2012.01)
*F02D 23/00* (2006.01)

(56) References Cited

U.S. PATENT DOCUMENTS

| | | | |
|---|---|---|---|
| 2003/0109357 A1* | 6/2003 | Tabata | 477/109 |
| 2005/0205379 A1* | 9/2005 | Tryon et al. | 192/70.17 |
| 2008/0120011 A1 | 5/2008 | Iwase et al. | |
| 2008/0153661 A1* | 6/2008 | Shibata et al. | 477/3 |
| 2009/0227408 A1* | 9/2009 | Imamura et al. | 475/5 |
| 2010/0025131 A1* | 2/2010 | Gloceri et al. | 180/65.28 |
| 2010/0151988 A1* | 6/2010 | Tabata et al. | 477/3 |
| 2010/0222982 A1* | 9/2010 | Wang et al. | 701/102 |
| 2011/0029179 A1* | 2/2011 | Miyazaki et al. | 701/22 |
| 2011/0213533 A1* | 9/2011 | Ueoka et al. | 701/66 |
| 2011/0231048 A1* | 9/2011 | Matsubara et al. | 701/22 |
| 2013/0184918 A1* | 7/2013 | Motosugi et al. | 701/22 |
| 2013/0282221 A1* | 10/2013 | Harada et al. | 701/22 |

FOREIGN PATENT DOCUMENTS

| | | |
|---|---|---|
| JP | A-11-350997 | 12/1999 |
| JP | A-2008-120177 | 5/2008 |
| JP | A-2010-179856 | 8/2010 |

* cited by examiner

CONTROL DEVICE FOR HYBRID VEHICLE

TECHNICAL FIELD

The present invention relates to a control device applied to a hybrid vehicle that is provided with an engine and an electric motor as power sources for driving.

BACKGROUND ART

A hybrid vehicle is per se known in which the power of an engine is divided between a first electric motor and an output unit, and a second electric motor is linked to the output unit via gears. With a hybrid vehicle of this type, the thrust upon the output unit of a gear interposed between the output unit and the second electric motor becomes slack when the torque of the second electric motor becomes near zero Nm. As a result, gear rattle noise is generated due to rotational fluctuations of the engine being transmitted to the output unit, since the output unit and the gear collide together because of mutual backlash. Thus, in order to suppress this type of gear rattle noise, a control device has been proposed (Patent Document #1) with which, when the torque of the second electric motor enters into a predetermined range that includes zero, fluctuation of the rotation of the engine is decreased by changing the operating point of the engine towards the high rotational speed side.

CITATION LIST

Patent Literature

Patent Document #1: Japanese Laid-Open Patent Publication 2010-179856.

SUMMARY OF INVENTION

Technical Problem

In recent years, in order to enhance engine fuel consumption, development of various types of engines has been performed. For example, there are: a cylinder deactivation engine in which, among a plurality of cylinders, a portion thereof are deactivated; an engine that is provided with a supercharger and that can perform both high supercharging pressure operation in which the supercharging pressure is high and low supercharging pressure operation in which the supercharging pressure is low; and an engine that can perform both lean combustion operation and stoichiometric combustion operation by changing the target air/fuel ratio. With these engines, the fluctuation of the output torque varies according to changing over of the operational state. In concrete terms, in the case of a cylinder deactivation engine, the fluctuation of output torque is greater during partial cylinder operation than during all-cylinder operation. And in the case of an engine in which the supercharging pressure changes, the fluctuation of the output torque is greater during high supercharging pressure operation than during low supercharging pressure operation. Moreover, in the case of an engine that can perform both lean combustion operation and stoichiometric combustion operation, the fluctuation of the output torque is greater during lean combustion operation than during stoichiometric combustion operation.

As an engine for a hybrid vehicle of the type described above, sufficient investigation has not yet been made of an engine whose state of output torque fluctuation changes according to changing over of its operational state in this manner. For example, in relation to suppression of gear rattle noise as described above, it has not yet been proposed to perform control appropriately adapted to both cases: high torque fluctuation operation in which fluctuation of the output torque is great, and low torque fluctuation operation in which fluctuation of the output torque is small.

Thus, the object of the present invention is to provide a control device applied to a hybrid vehicle including an engine, that can perform high torque fluctuation operation in which fluctuation of the output torque is great and low torque fluctuation operation in which fluctuation of the output torque is small.

Solution to Technical Problem

The control device of the present invention is applied to a hybrid vehicle comprising: an engine that is capable of performing high torque fluctuation operation in which fluctuation of the output torque is high and low torque fluctuation operation in which fluctuation of the output torque is low; a first electric motor; an output unit for transmitting torque to drive wheels; a differential mechanism that distributes torque of the engine to the first electric motor and the output unit; and a second electric motor that is linked to the output unit via a gear; and causes the engine to execute the high torque fluctuation operation and the low torque fluctuation operation, and moreover changes the operating point of the engine when the torque of the second electric motor is within a predetermined range; wherein the predetermined range is set to be wider when the engine is executing the high torque fluctuation operation, as compared to when the engine is executing the low torque fluctuation operation.

The ranges of torque of the second electric motor at which gear rattle noise is generated differ for different levels of engine torque fluctuation. Due to this, if the range of torque of the second electric motor at which gear rattle noise is generated is set to match high torque fluctuation operation in which torque fluctuation is high, and the operating point of the engine is changed when the torque of the second electric motor enters into this range, then it is possible to suppress gear rattle noise both during high torque fluctuation operation and during low torque fluctuation operation. However, the operating point of the engine is also changed during low torque fluctuation operation in which torque fluctuation is low, even though in this region the torque of the second electric motor does not generate gear rattle noise. Accordingly the fuel consumption is deteriorated, since during low torque fluctuation operation the operating point of the engine is unnecessarily changed. Conversely, if the range of torque of the second electric motor at which gear rattle noise is generated is set to match low torque fluctuation operation in which the fluctuation of torque is low, and the operating point of the engine is changed when the torque of the second electric motor enters within this range, then it is possible to suppress deterioration of the fuel consumption, since the chance of the operating point of the engine being changed during low torque fluctuation operation is reduced. However, since in some cases it is not possible to suppress the generation of gear rattle noise during high torque fluctuation operation, accordingly there is a fear that, in this type of situation, the driver may experience a sense of discomfort. But, with the control device of the present invention, the predetermined range of torque of the second electric motor, which is the condition for the operating point of the engine to be changed, is set to be higher during high torque fluctuation operation, as compared to during low torque fluctuation operation. Accordingly, the operating point of the engine is changed in conditions that are matched both to high torque fluctuation operation and to low torque fluctuation operation. Due to this, it is possible for suppression of gear rattle noise and prevention of deterioration of the fuel consumption to be mutually compatible. It should be understood that low torque fluctuation operation means a type of operation in which the fluctuations of torque are relatively lower than during high torque fluctuation operation.

As one aspect of the control device of the present invention, it would also be acceptable further to provide a lock device that is capable of changing over the state of the differential mechanism from a differential state in which it distributes the torque of the engine to the first electric motor and to the output unit to a non-differential state in which it stops this distribution; and, if the torque of the second electric motor is within the predetermined range, to change the operating point of the engine by operating the lock device so that the state of the differential mechanism is changed over from the differential state to the non-differential state. According to this aspect, by changing over the differential mechanism from the differential state to the non-differential state, the torque of the engine is transmitted to the output unit without any of that torque being distributed to the first electric motor. In other words, by changing over the differential mechanism from the differential state to the non-differential state, a one-to-one correspondence relationship is established between the rotational speed of the engine and the speed of the vehicle. Due to this, it is possible to change the operating point of the engine so that the rotational speed of the engine changes towards the high rotational speed side.

With this aspect it would also be acceptable, when the operating point of the engine is changed by the state of the differential mechanism being changed over from the differential state to the non-differential state, to arrange to control the hybrid vehicle so that the drive force required by the driver is outputted by totaling the sum of the torque of the engine and the torque of the second electric motor. According to this type of control, the torque of the engine is kept on the low torque side, and moreover any shortage of torque is compensated with the second electric motor. Engine torque fluctuation has the characteristic of becoming lower, the more the operating point changes towards the high rotational speed low torque side. Thus a benefit is obtained with regard to suppression of gear rattle noise by performing this control, since the operating point of the engine is changed towards the low torque side.

And, as another aspect of the control device of the present invention, it would also be acceptable for the engine to include a plurality of cylinders and to be capable of performing, as the high torque fluctuation operation, partial cylinder operation in which some among the plurality of cylinders are deactivated while the remaining ones of the cylinders operate, and, as the low torque fluctuation operation, all-cylinder operation in which all of the plurality of cylinders are operated; and further to include a lock device that is capable of changing over the state of the differential mechanism from a differential state in which it distributes the torque of the engine to the first electric motor and to the output unit to a non-differential state in which it stops this distribution, and a change device that changes the operating point of the engine while the differential mechanism remains in the differential state; and: during the all-cylinder operation, to change the operating point of the engine with the change device when the torque of the second electric motor is within the predetermined range; and, during the partial cylinder operation, to change the operating point of the engine by operating the lock device when the torque of the second electric motor is within the predetermined range, so that the state of the differential mechanism is changed over from the differential state to the non-differential state.

During partial cylinder operation, since some of the cylinders are deactivated, accordingly the torque that can be outputted is small as compared to all-cylinder operation. To put it in another manner, the normal line that connects the normal operating points during partial cylinder operation is positioned more towards the low torque side than the normal line during all-cylinder operation. If the operating point of the engine is changed by changing over the differential mechanism to the non-differential state, then the operating point of the engine changes towards the high rotational speed low torque side. When the amount of change when the operating point is changed by changing over the differential mechanism to the non-differential state during all-cylinder operation, and the amount of change when the operating point is changed by changing over the differential mechanism to the non-differential state during partial cylinder operation are compared together in the same vehicle speed condition, the amount of change during all-cylinder operation is greater as compared to the amount of change during partial cylinder operation. For each of all-cylinder operation and partial cylinder operation, it is normal for the normal line to be set in consideration of attaining as good a fuel consumption as possible. Accordingly, if the operating point of the engine that is positioned upon the normal line is changed, it is desirable for this amount of change to be as small as possible. Due to this, when the operating point of the engine is to be changed during partial cylinder operation, it is appropriate to implement this by changing over the differential mechanism to the non-differential state. On the other hand, when the operating point of the engine is to be changed during all-cylinder operation, changing the operating point of the engine by changing over the differential mechanism to the non-differential state is avoided, and it is more appropriate to change the operating point of the engine while keeping the differential mechanism in its differential state. In the aspect of the present invention described above, the operating point of the engine is changed during all-cylinder operation with the differential mechanism in its differential state, while during partial cylinder operation the operating point of the engine is changed by changing over the differential mechanism to its non-differential state. Since in this manner the operating point of the engine is changed over by an appropriate method, both during all-cylinder operation and during partial cylinder operation, accordingly it is possible to suppress gear rattle noise, while still there is no tendency for the fuel consumption to be deteriorated.

DESCRIPTION OF EMBODIMENTS

Embodiment #1

Figure 1:
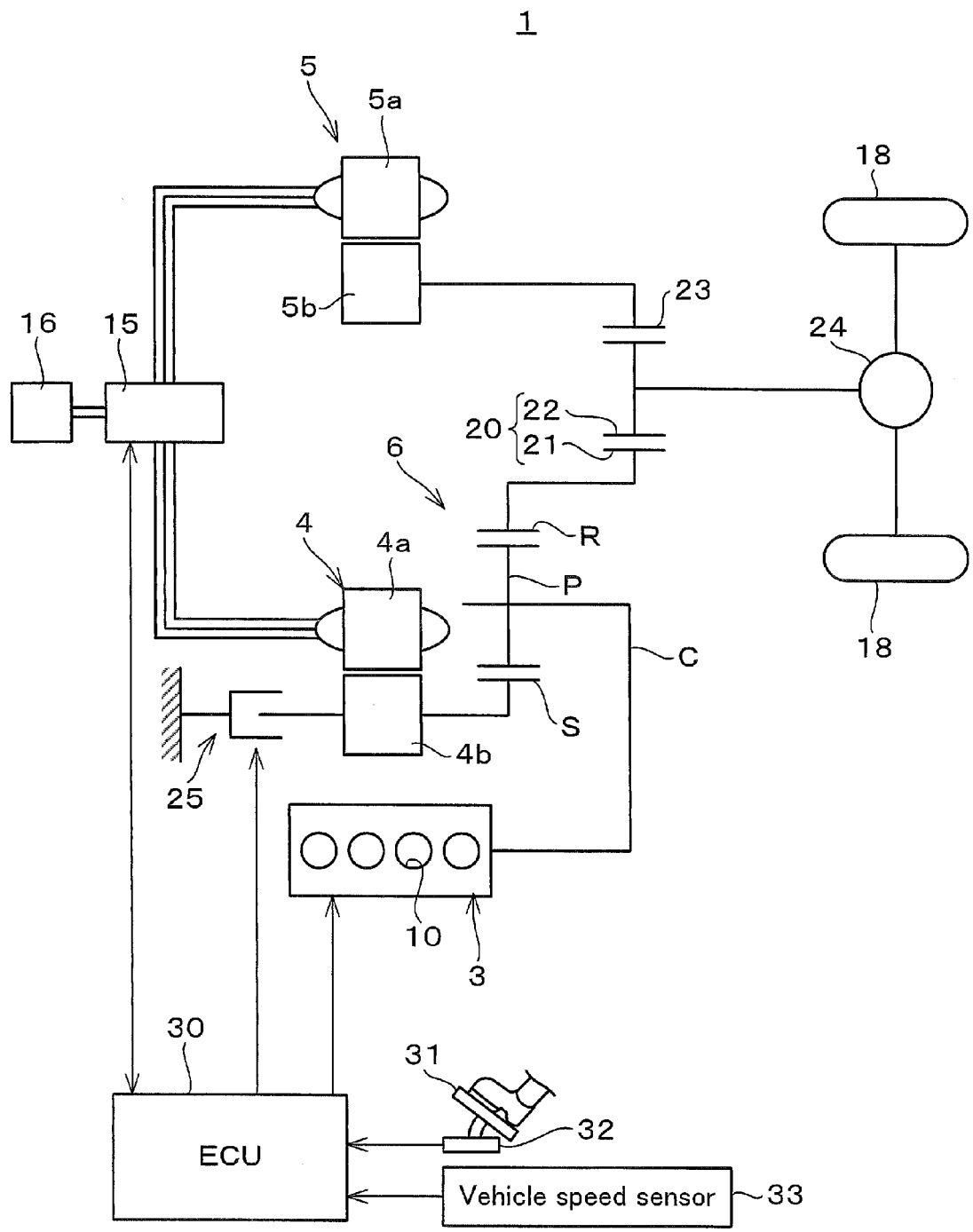
FIG. 1 is a figure showing the overall structure of a vehicle to which a control device according to an embodiment of the present invention is applied.

As shown in FIG. 1, a vehicle 1 is built as a hybrid vehicle in which a plurality of power sources are combined. The vehicle 1 comprises an engine 3 and two motor-generators 4 and 5 that serve as power sources for propulsion. The engine 3 is built as an internal combustion engine of the four cylinder in-line type having four cylinders 10. The engine 3 is able to perform all-cylinder operation in which all of the four cylinders 10 operate, and also partial cylinder operation in which two of the four cylinders 10 are deactivated and the remaining two operate.

The engine 3 and the first motor-generator 4 are linked to a power split mechanism 6 that serves as a differential mechanism. The first motor-generator 4 has a stator 4a and a rotor 4b. The first motor-generator 4 both functions as a generator that receives mechanical power from the engine 3 after distribution by the power split mechanism 6 and generates electricity, and also functions as an electric motor that is driven by AC electrical power. In a similar manner, the second motor-generator 5 has a stator 5a and a rotor 5b, and functions both as an electric motor and as a generator. Both of the motor-generators 4 and 5 are connected to a battery 16 via a motor control device 15. The motor control device 15 converts electrical power generated by the motor-generators 4 and 5 into DC power that charges into the battery 16, and also converts electrical power from the battery 16 into AC power that is supplied to the motor-generators 4 and 5. The first motor-generator 4 corresponds to the "first electric motor" of the Claims, while the second motor-generator 5 corresponds to the "second electric motor" of the Claims.

The power split mechanism 6 is built as a single pinion type planetary gear mechanism. The power split mechanism 6 comprises a sun gear S that is an external gear, a ring gear R that is disposed coaxially with the sun gear S and is an internal gear, and a planet carrier C that supports a pinion P meshed with these gears S and R so that the pinion rotates and revolves. The engine torque outputted by the engine 3 is transmitted to the planet carrier C of the power split mechanism 6. The rotor 4b of the first motor-generator 4 is linked to the sun gear S of the power split mechanism 6. And torque outputted from the power split mechanism 6 via its ring gear R is transmitted to an output gear train 20. The output gear train 20 functions as an output unit for transmitting torque to drive wheels 18. And the output gear train 20 comprises an output drive gear 21 that rotates together with the ring gear R of the power split mechanism 6, and an output driven gear 22 that is meshed with this output drive gear 21. The second motor-generator 5 is linked to this output driven gear 22 via a gear 23. The gear 23 thus rotates together with the rotor 5b of the second motor-generator 5. And torque outputted from the output driven gear 22 is distributed via a differential device 24 to left and right drive wheels 18.

A motor locking mechanism 25 is provided to the power split mechanism 6, and serves as a locking device. This motor locking mechanism 25 can change over the state of the power split mechanism 6 between a differential state in which it distributes the torque of the engine 3 to the first motor-generator 4 and to the output gear train 20, and a non-differential state in which it ceases this distribution. The motor locking mechanism 25 is built as a wet type multi-plate brake mechanism. This motor locking mechanism 25 is changed over between an engaged state in which it prevents rotation of the rotor 4b of the first motor-generator 4, and a released state in which it permits rotation of the rotor 4b. Changing over of the motor locking mechanism 25 between its engaged state and its released state is implemented with a hydraulic actuator not shown in the drawings. When the motor locking mechanism 25 is operated to be in its engaged state, rotation of the rotor 4b of the first motor-generator 4 is prevented. Due to this, rotation of the sun gear S of the power split mechanism 6 is also prevented. And, due to this, distribution of torque of the engine 3 to the first motor-generator 4 is stopped, and the power split mechanism 6 is put into its non-differential state.

Control of various units of the vehicle 1 is performed by an electronic control device 30 (i.e. an ECU). The ECU 30 performs various types of control for the engine 3, the motor-generators 4 and 5, and the motor locking mechanism 25 and so on. In the following, the principal features of the control that the ECU 30 performs in relation to the present invention will be explained. Various types of information related to the vehicle 1 are inputted to the ECU 30. For example, the rotational speeds and torque of the motor-generators 4 and 5 are inputted to the ECU 30 via the motor control device 15. Moreover, both the output signal of an accelerator opening amount sensor 32 that outputs a signal corresponding to the amount by which an accelerator pedal 31 is stepped upon, and also the output signal of a vehicle speed sensor 33 that outputs a signal corresponding to the speed of the vehicle 1, are inputted to the ECU 30. The ECU 30 refers to the output signal of the accelerator opening amount sensor 32 and to the output signal of the vehicle speed sensor 33 and calculates the required drive force that is being demanded by the driver, and controls the vehicle 1 while changing over between various modes, so as to bring the system efficiency for this required drive force to optimum. For example, in a low load region in which the thermal efficiency of the engine 3 decreases, an EV mode may be selected in which combustion of fuel by the engine 3 is stopped and the second motor-generator 5 is driven. Moreover, if the torque provided by the internal combustion engine 3 is insufficient by itself, then a hybrid mode may be selected in which, along with the engine 3, the second motor-generator 5 is also used as a source of drive power for propulsion.

Figure 2:
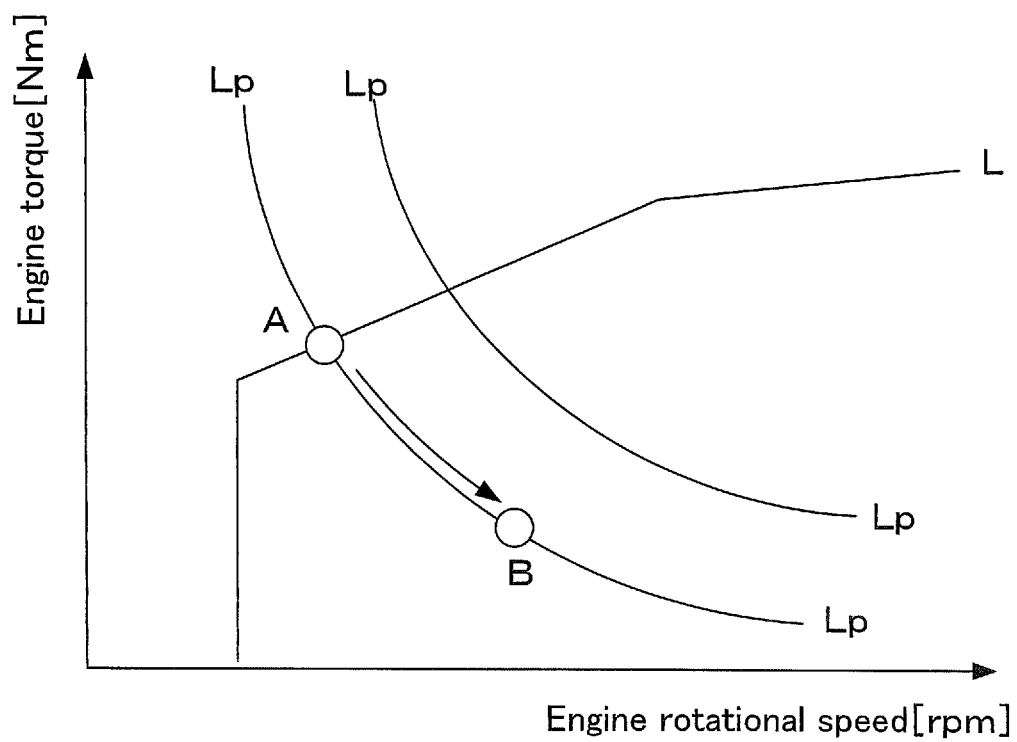
FIG. 2 is a figure for explanation of operating points of an engine during the hybrid mode.

If the hybrid mode is selected, then the required drive force is outputted as the combined sum of the engine torque from the engine 3 and the motor torque from the second motor-generator 5. In other words, if the engine torque is termed Te and the motor torque is termed Tm, then the required drive force Td is defined by Td=Te+Tm. As shown in FIG. 2, the engine 3 is controlled by the ECU 30 so that its operating point, which is defined by the engine rotational speed and the engine torque, shifts upon a normal line L that is set in advance. This normal line L is determined in advance by simulation or by testing using an actual engine, so that the fuel consumption of the engine 3 becomes optimum and moreover the noise can be reduced. As described above, the engine 3 is capable of performing both all-cylinder operation and also partial cylinder operation. The fuel consumption characteristic and the noise characteristic of the engine 3 are different when it is performing all-cylinder operation and when it is performing partial cylinder operation. Due to this, normal lines L are provided for the case of all-cylinder operation and also for the case of partial cylinder operation. While, during partial cylinder operation when the reqired drive force is low, the fuel consumption is enhanced over all-cylinder operation since combustion in some of the cylinders 10 is deactivated, on the other hand the torque fluctuation is high as compared to when performing all-cylinder operation.

If the greater portion of the required drive force is covered by engine torque, then the motor torque has a small value in the vicinity of zero. When the motor torque has this type of small value, gear rattle noise is generated between the gear train 20 and the gear 23. Thus, when the engine 3 is operating with its operating point upon the normal line, if the motor torque is in a range in which it has this type of small value, then the ECU 30 changes the operating point of the engine 3 in order to suppress gear rattle noise. For example, as shown in FIG. 2, if the motor torque is within a predetermined range, then the operating point of the engine 3 is changed as shown by the arrow along the line of equal power Lp, from the point A on the normal line L to the point B which is more to the high rotational speed low load side. The generation of gear rattle noise and its level are influenced by the torque fluctuations of the engine 3, and the ranges of motor torque in which gear rattle noise is generated are different for the case of all-cylinder operation and for the case of partial cylinder operation.

Figure 3:
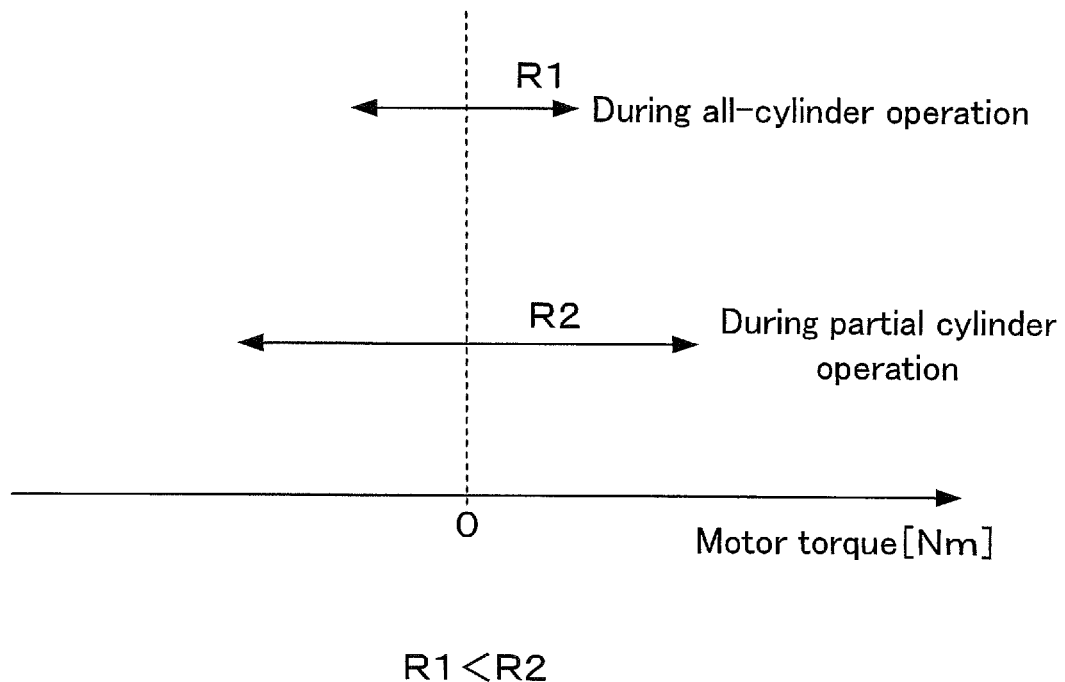
FIG. 3 is a figure for explanation of ranges of operating point changeover, within which the operating point of the engine is changed.
Figure 4A:
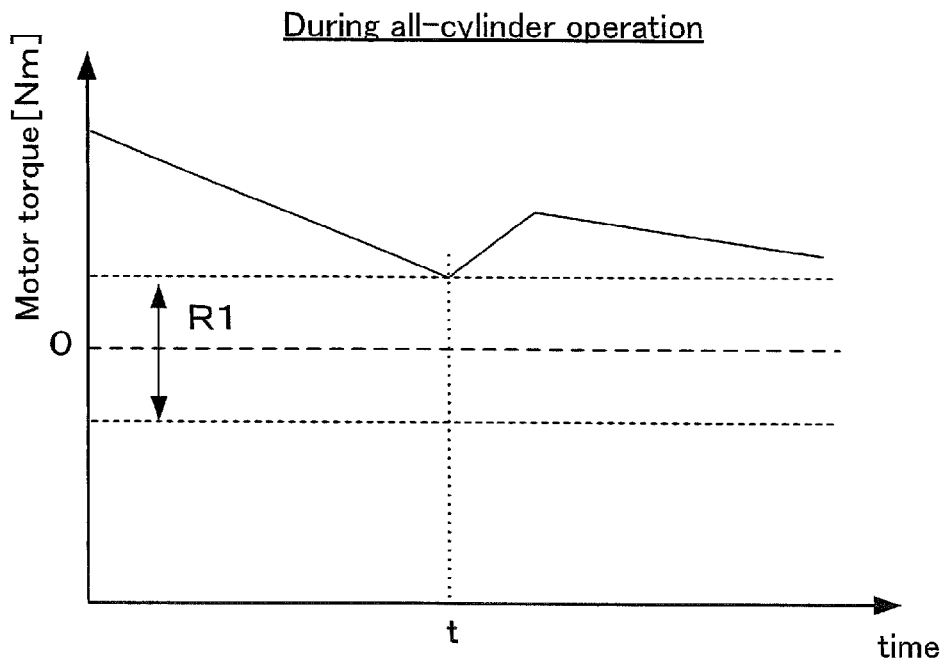
FIG. 4A is a timing chart showing change of motor torque during all-cylinder operation.
Figure 4B:
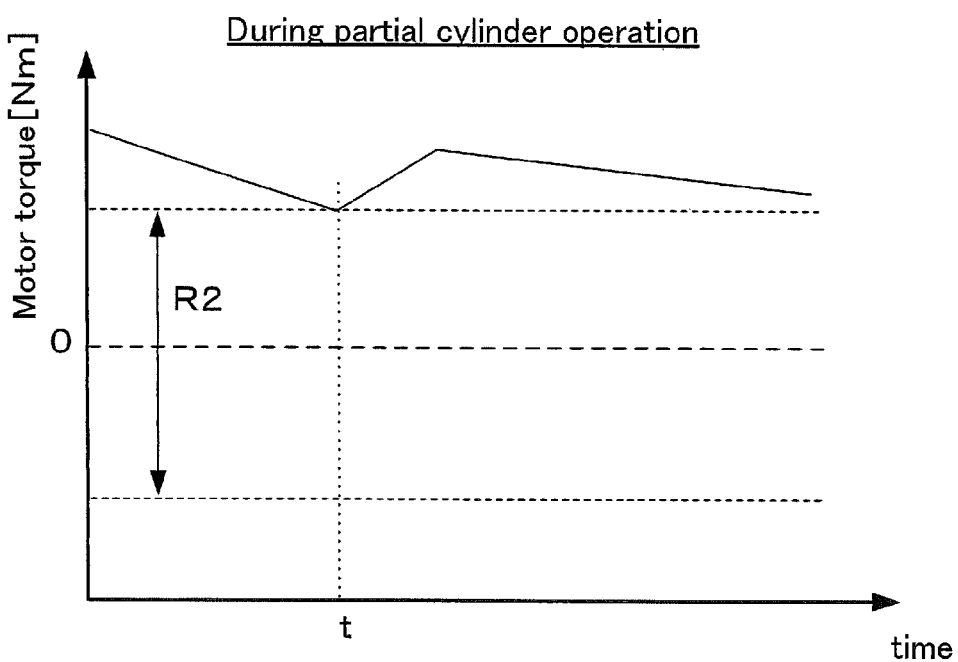
FIG. 4B is a timing chart showing change of motor torque during partial cylinder operation.

As shown in FIG. 3, the operating point changeover range R2 of motor torque in which the ECU 30 changes the operating point of the engine 3 during partial cylinder operation is set to be wider than the operating point changeover range R1 during all-cylinder operation. For example, the operating point changeover range R1 during all-cylinder operation may be set to −3 Nm~+3 Nm, while the operating point changeover range R1 during partial cylinder operation is set to −5 Nm~+5 Nm. As shown in FIGS. 4A and 4B, the operating point of the engine is changed at the time point t that the motor torque of the second motor-generator 5 enters into the operating point changeover range R1 or R2. While the engine torque decreases due to this change of the operating point, the motor torque alters so as to increase, in order to compensate for this decrease of engine torque. Due to this, gear rattle noise is suppressed.

Figure 5:
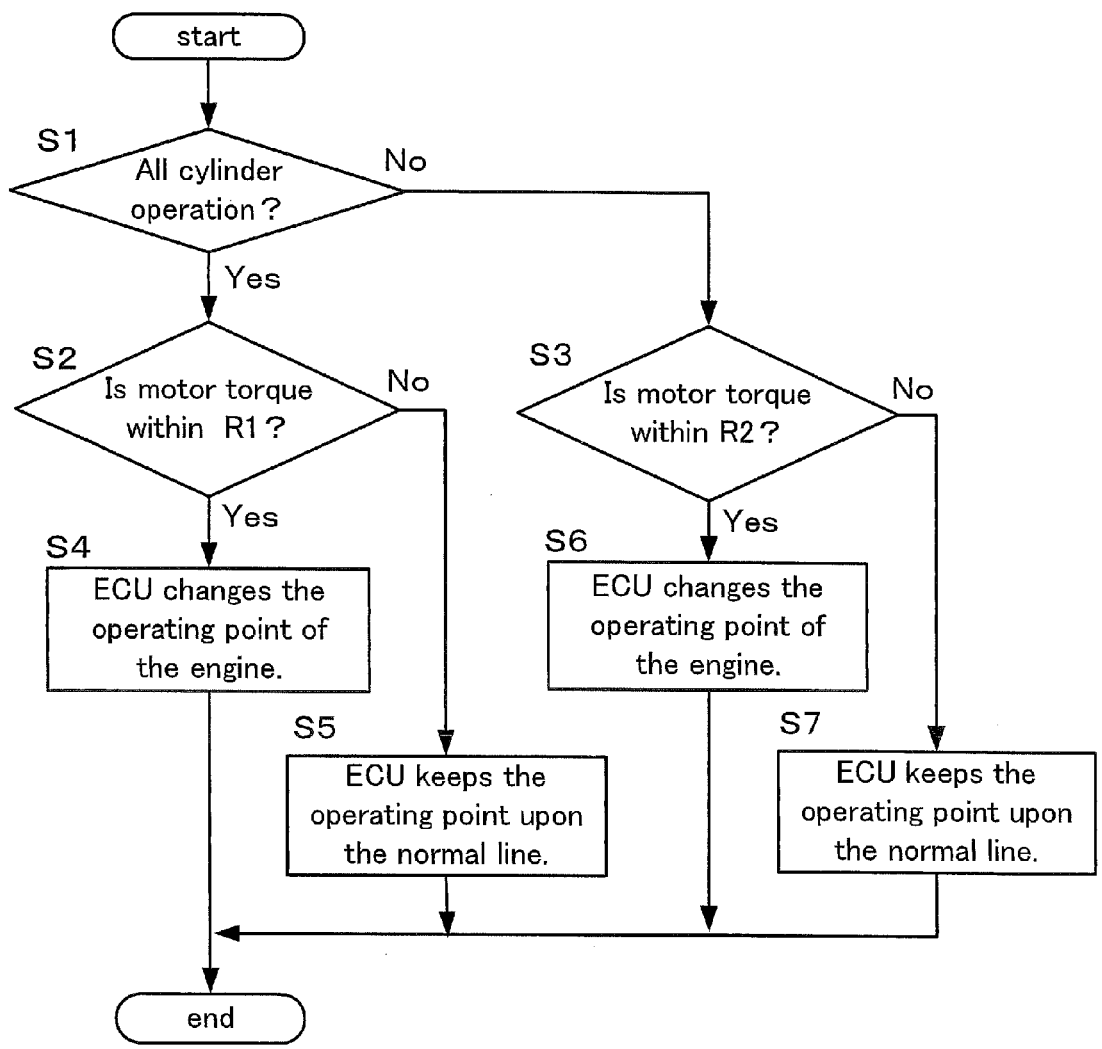
FIG. 5 is a flow chart showing an example of a control routine relating to a first embodiment of the present invention.

Next, an example of a control routine performed by the ECU 30 will be explained with reference to FIG. 5. A program for the control routine of FIG. 5 is stored in the ECU 30, and is read out as appropriate and repeatedly executed at predetermined intervals. In a first step S1, the ECU 30 makes a decision as to whether or not the engine 3 is performing all-cylinder operation. If the engine 3 is performing all-cylinder operation, then the flow of control proceeds to a step S2. But if the engine 3 is not performing all-cylinder operation, in other words if it is performing partial cylinder operation, then the flow of control is transferred to a step S3.

In the step S2, the ECU 30 makes a decision as to whether or not the motor torque of the second motor-generator 5 is within the operating point changeover range R1. If the motor torque is within the operating point changeover range R1, then the flow of control is transferred to a step S4, in which the ECU 30 changes the operating point of the engine 3 to the high rotational speed low torque side, and then this cycle of the routine is terminated. On the other hand, if the motor torque is not within the operating point changeover range R1, then the flow of control is transferred to a step S5, in which the ECU 30 keeps the operating point upon the normal line L described above. And then the ECU 30 terminates this cycle of the routine.

And in the step S3, the ECU 30 makes a decision as to whether or not the motor torque of the second motor-generator 5 is within the operating point changeover range R2. If the motor torque is within the operating point changeover range R2, then the flow of control is transferred to a step S6, in which the ECU 30 changes the operating point of the engine 3 to the high rotational speed low torque side, and then this cycle of the routine is terminated. On the other hand, if the motor torque is not within the operating point changeover range R2, then the flow of control is transferred to a step S7, in which the ECU 30 keeps the operating point upon the normal line L described above. And then the ECU 30 terminates this cycle of the routine.

By the ECU 30 executing the control routine of FIG. 5, the operating point of the engine 3 is changed so as to suppress gear rattle noise under conditions matched both to partial cylinder operation and to all-cylinder operation. By doing this, it is possible to reconcile suppression of gear rattle noise with prevention of deterioration of the fuel consumption.

Embodiment #2

Figure 6:
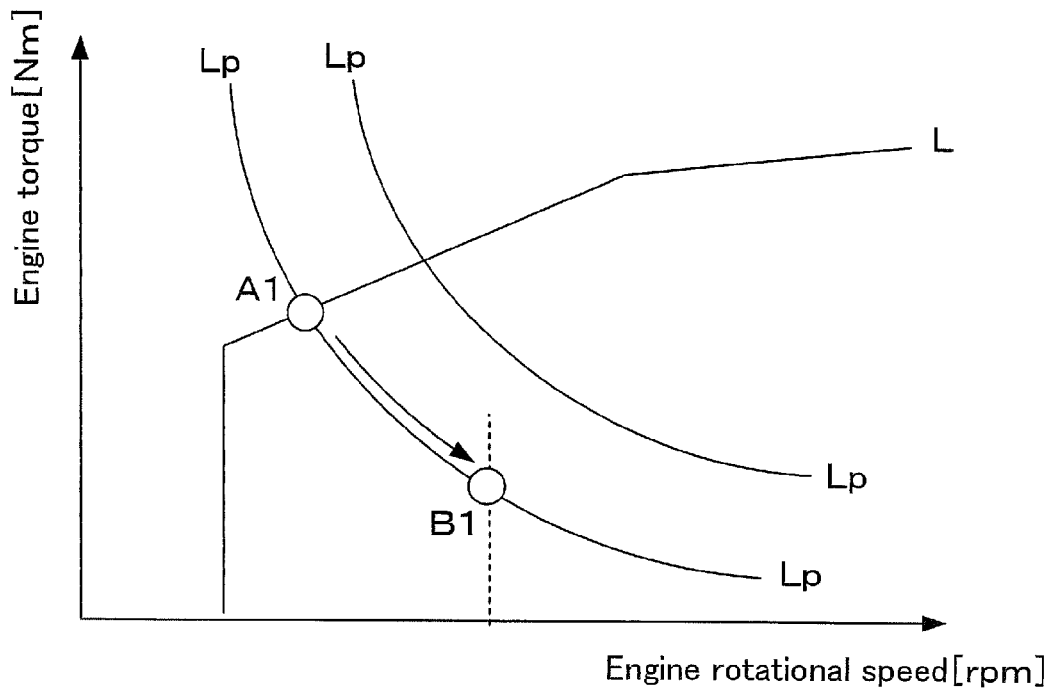
FIG. 6 is a figure showing an example of implementation of changeover of the operating point of an engine by operation of a motor locking mechanism.

The second embodiment is distinguished by the feature that change of the operating point of the engine 3 is implemented by operation of the motor locking mechanism 25. In other words, if the motor torque has entered the operating point changeover range R1 or R2, then the ECU 30 operates the motor locking mechanism 25 and prevents rotation of the first motor-generator 4, so that the power split mechanism 6 is changed over from the differential state to the non-differential state. Due to this, none of the torque of the engine 3 is distributed to the first motor-generator 4, and this torque is entirely transmitted to the output gear train 20. In other words, by changing over the power split mechanism 6 from the differential state to the non-differential state, a one-to-one correspondence relationship is established between the rotational speed of the engine 3 and the vehicle speed. Due to this, as shown by the arrow in FIG. 6, the operating point upon the normal line L shifts from the point A1 along the line of equal power Lp to the operating point B1 in the non-differential state. Since the operating point of the engine 3 is changed from the point A1 to the point B1 that is positioned to the high rotational speed low torque side thereof, accordingly torque fluctuation of the engine 3 is reduced. As a result, gear rattle noise is suppressed. In the FIG. 6 case, before and after change of the operating point of the engine 3 in order to shift the operating point along the line of equal power Lp, the power of the engine 3 is kept constant.

Figure 7:
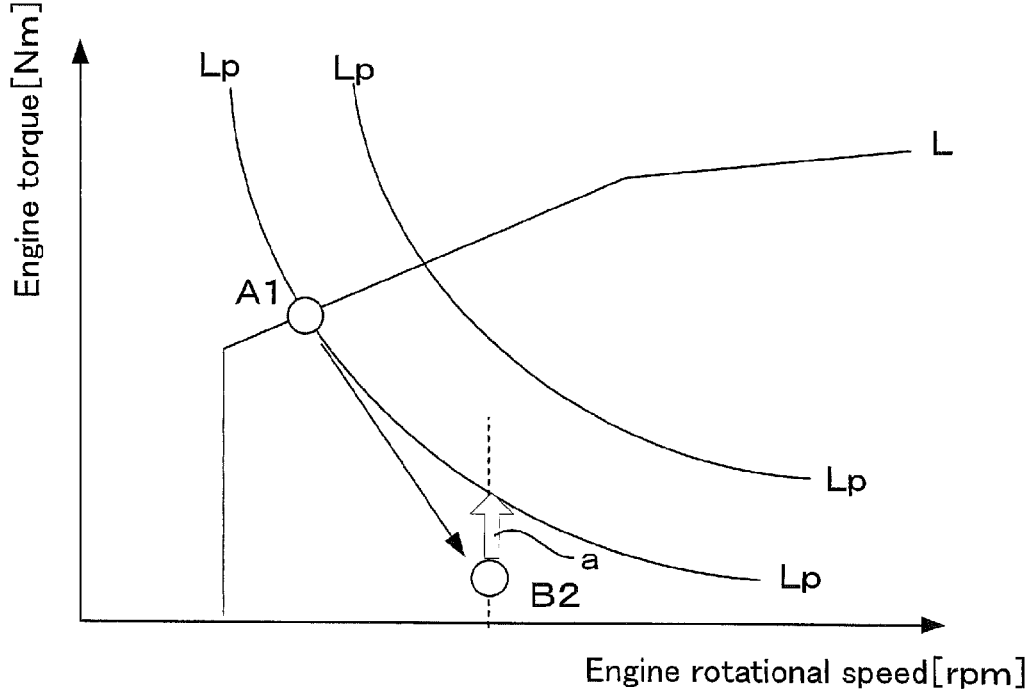
FIG. 7 is a figure showing another example of implementation of changeover of the operating point of an engine by operation of a motor locking mechanism.

It should be understood that it would also be possible to change the operating point of the engine 3 as shown in FIG. 7 by operating the motor locking mechanism 25. In the FIG. 7 case, torque fluctuation of the engine 3 is further reduced, since the operating point of the engine 3 shifts from the point A1 to the point B2 which is at the same rotational speed as the point B1 of FIG. 6 but to the low torque side thereof. Accordingly, the beneficial effect of suppression of gear rattle noise is enhanced further over the FIG. 6 case. Since, in the FIG. 7 case, due to change of the operating point, the operating point departs from the line of equal power Lp, accordingly the power that the engine 3 is required to output decreases. As shown by the arrow a, this decrease of power is compensated by increase of the motor torque. Furthermore, since the operating point reliably departs from the operating point changeover range R1 or R2 due to this increase of the motor torque, accordingly more benefit is obtained with regard to suppression of gear rattle noise than in the FIG. 6 case.

Embodiment #3

Figure 8A:
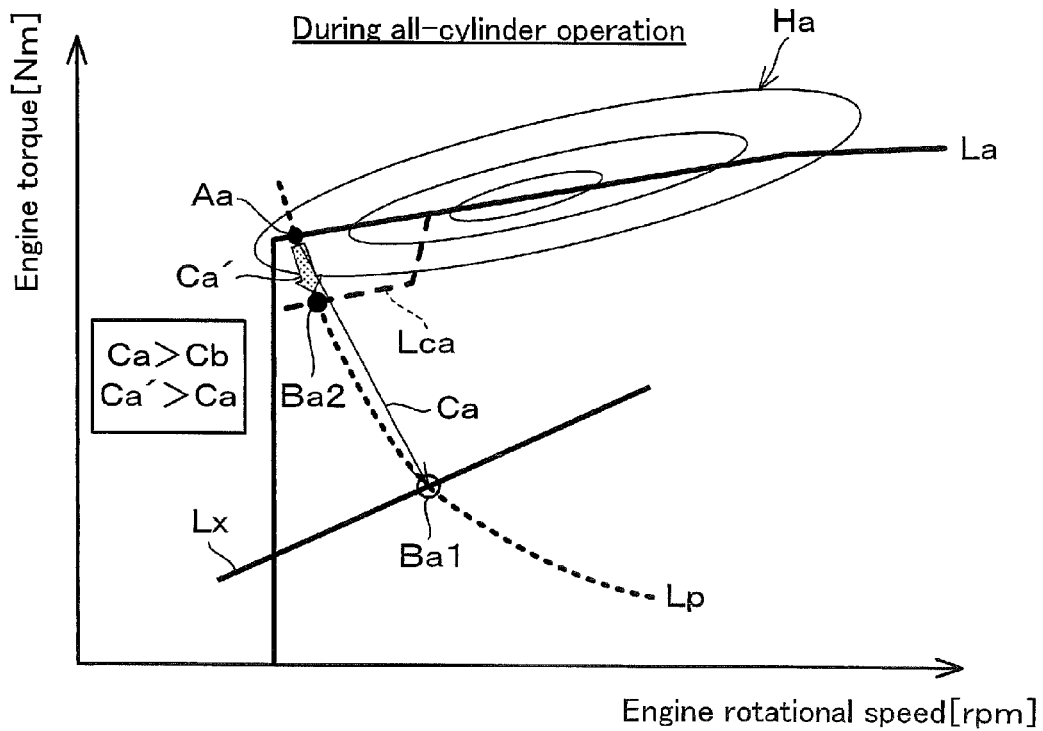
FIG. 8A is a figure for explanation of changeover of the operating point of the engine during all-cylinder operation.
Figure 8B:
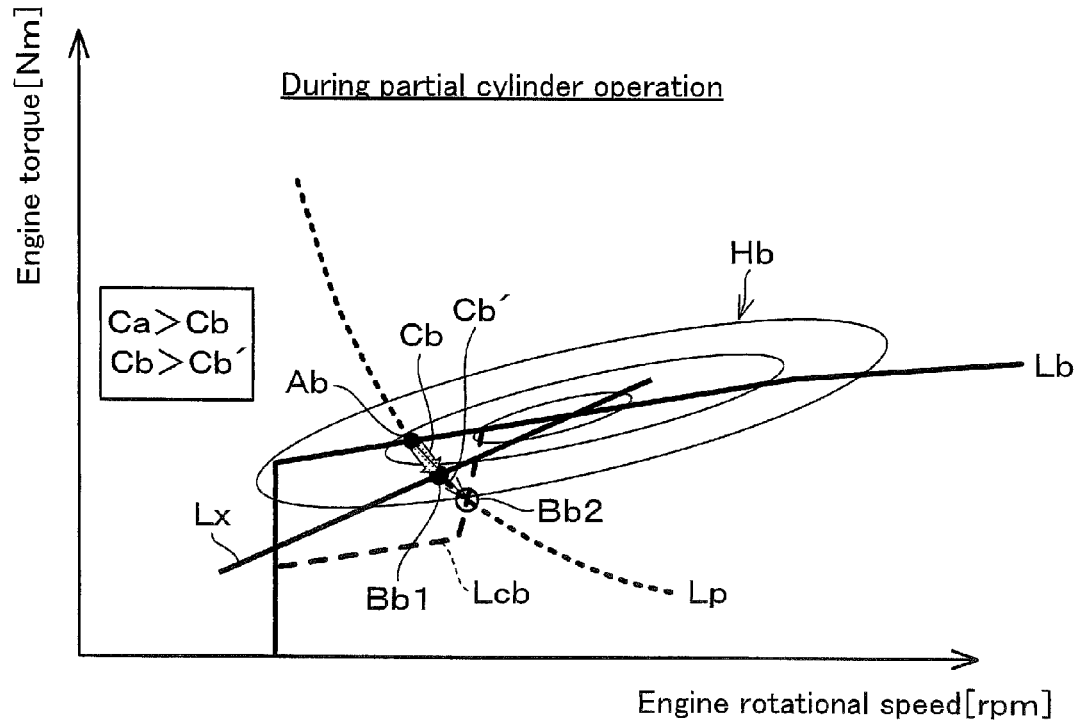
FIG. 8B is a figure for explanation of changeover of the operating point of the engine during partial cylinder operation.

The third embodiment is distinguished by the feature that the method of changing over the operating point of the engine 3 is changed over between the case of all-cylinder operation and the case of partial cylinder operation. In partial cylinder operation, the torque that can be outputted is smaller as compared with all-cylinder operation, since some of the cylinders are deactivated. In other words, as shown in FIGS. 8A and 8B, the normal line Lb during partial cylinder operation is positioned more towards the low torque side than the normal line La during all-cylinder operation. Since, as described above, the normal lines La and Lb are set so that the fuel consumption of the engine 3 becomes optimum, accordingly the normal lines La and Lb are set so as to pass through the centers of the contour lines Ha and Hb for the thermal efficiency of the engine 3, in other words are set so as to pass through the positions where the thermal efficiency of the engine 3 is at its highest.

When the operating point of the engine 3 is changed by changing over the power split mechanism 6 from the differential state to the non-differential state, the operating point of the engine 3 shifts along a lock operation line Lx. This lock operation line Lx is set in common for the case of all-cylinder operation and for the case of partial cylinder operation. When the power split mechanism 6 is operated in the non-differential state, the rotational speed of the engine 3 and the vehicle speed come to be in a one-to-one relationship, and accordingly the lock operation line Lx becomes a straight line towards the upper right of the figure. And, as shown in FIGS. 8A and 8B, when the operating point of the engine 3 is changed by changing over the power split mechanism 6 from the differential state to the non-differential state, the operating point on the normal line La changes from the point Aa to the point of intersection Ba1 of the line of equal power Lp and the lock operation line Lx, while the operating point on the normal line Lb changes from the point Ab to the point of intersection Bb1 of the line of equal power Lp and the lock operation line Lx.

As shown in FIG. 8A, when during all-cylinder operation the operating point is changed by changing over the power split mechanism 6 from the differential state to the non-differential state, its amount of change becomes Ca. Furthermore, as shown in FIG. 8B, when during partial cylinder operation the operating point is changed by changing over the power split mechanism 6 from the differential state to the non-differential state, its amount of change becomes Cb. When these amounts of change Ca and Cb are compared together, as will be clear from FIGS. 8A and 8B, the amount of change Ca during all-cylinder operation is greater than the amount of change Cb during partial cylinder operation. When the operating point of the engine 3 that is positioned upon the normal line La or Lb changes, it is desirable for the amount of change thereof to be as small as possible. In other words, it is desirable to depart from the center of the contour line Ha or Hb as little as possible. Accordingly, as shown in FIG. 8B, during partial cylinder operation, by changing over the power split mechanism 6 from the differential state to the non-differential state, it is appropriate to change the operating point from the point Ab to the point Bb1.

On the other hand, when during all-cylinder operation the operating point of the engine changes, it is appropriate to avoid changing the operating point of the engine 3 from the point Aa to the point Ba1 by changing over the power split mechanism 6 to the non-differential state, and rather it is appropriate to change the operating point of the engine 3 while keeping the power split mechanism 6 in the differential state without change thereof. If the operating point of the engine 3 is changed while the power split mechanism 6 remains as it is in the differential state, then it is possible to suppress gear rattle noise by shifting the operating point along the gear rattle noise suppression lines Lca, Lcb. The gear rattle noise suppression lines Lca and Lcb are lines that are set in advance by simulation or by testing of an actual engine, under the condition that it should be possible to suppress gear rattle noise while causing the least possible deterioration of the fuel consumption. Accordingly, as shown in FIG. 8A, when the operating point of the engine 3 is to be changed during all-cylinder operation, it is appropriate to change it along the line of equal power Lp, from the point Aa upon the normal line La to the point Ba2, while keeping the power split mechanism 6 in the differential state without change.

As shown in FIG. 8A, the amount of change Ca' when, during all-cylinder operation, the operating point of the engine 3 is changed from the point Aa upon the normal line La along the gear rattle noise suppression line Lca to the point Ba2 is smaller than the amount of change Ca when the power split mechanism 6 is changed over to the non-differential state. On the other hand, as shown in FIG. 8B, the amount of change Cb' when, during partial cylinder operation, the operating point of the engine 3 is changed from the point Ab upon the normal line Lb along the gear rattle noise suppression line Lcb to the point Bb2 is greater than the amount of change Cb when the power split mechanism 6 is changed over to the non-differential state. Thus, due to the above facts, when changing the operating point of the engine 3 during all-cylinder operation, it is considered that it is appropriate to change it from the point Aa upon the normal line La along the line of equal power Lp to the point Ba2. On the other hand, when changing the operating point of the engine 3 during partial cylinder operation, it is considered that it is appropriate to change it from the operating point Ab to the point Bb1 by changing over the power split mechanism 6 from the differential state to the non-differential state.

It should be understood that the gear rattle noise suppression lines Lca and Lcb are determined when the engine 3 is operating with the power split mechanism 6 in its differential state. Accordingly when the operating point of the engine 3 is positioned upon the lock line Lx, as in FIG. 8B, gear rattle noise is suppressed since the characteristic of torque fluctuation transmitted to the output gear train 20 changes, even though the operating point of the engine 3 is not positioned upon the gear rattle noise suppression line Lcb.

Figure 9:
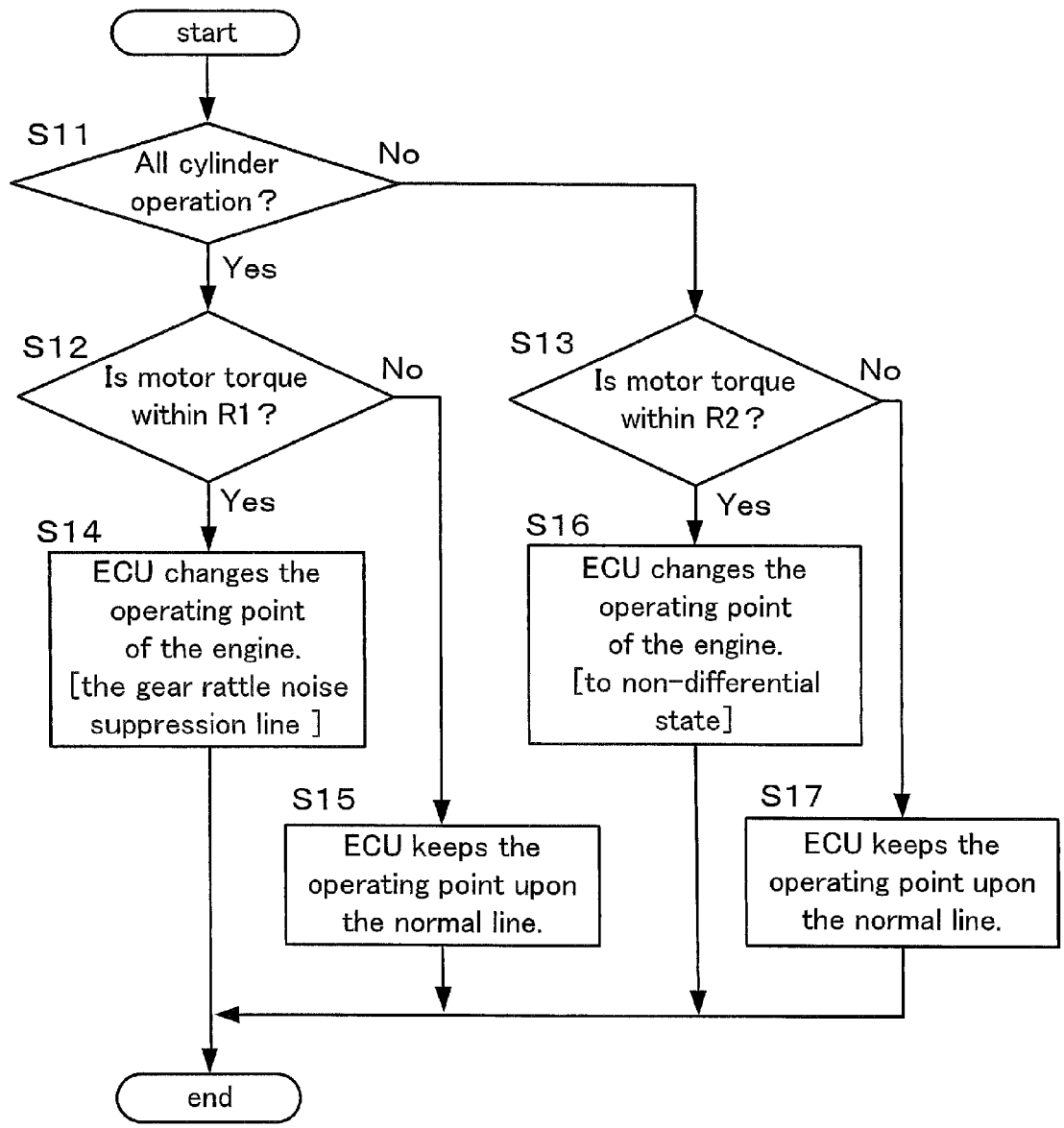
FIG. 9 is a flow chart showing an example of a control routine relating to a third embodiment of the present invention.

Next, an example of a control routine performed by the ECU 30 will be explained with reference to FIG. 9. The program of the control routine of FIG. 9 is stored in the ECU 30, and is read out at an appropriate timing and repeatedly executed at predetermined intervals. First, in a step S11, the ECU 30 makes a decision as to whether or not the engine 3 is performing all-cylinder operation. If the engine 3 is performing all-cylinder operation, then the flow of control proceeds to a step S12. But if the engine 3 is not performing all-cylinder operation, in other words in the case of partial cylinder operation, the flow of control is transferred to a step S13.

In the step S12, the ECU 30 makes a decision as to whether or not the motor torque of the second motor-generator 5 has entered into the operating point changeover range R1. If the motor torque has entered into the operating point changeover range R1, then the flow of control is transferred to a step S14, in which the ECU 30 changes the operating point of the engine 3 as shown in FIG. 8A from the point Aa upon the normal line La along the line of equal power Lp to the point Ba2 upon the gear rattle noise suppression line Lca, and then this cycle of the routine terminates. On the other hand, if the motor torque has not entered into the operating point changeover range R1, then the flow of control is transferred to a step S15, in which the ECU 30 keeps the operating point upon the normal line La of FIG. 8A. And then this cycle of the routine terminates.

In the step S13, the ECU 30 makes a decision as to whether or not the motor torque of the second motor-generator 5 has entered into the operating point changeover range R2. If the motor torque has entered into the operating point changeover range R2, then the flow of control is transferred to a step S16, in which the ECU 30 operates the motor locking mechanism 25 from the released state to the engaged state, so that the power split mechanism is changed over from its differential state to its non-differential state. Due to this, the ECU 30 changes the operating point of the engine 3 as shown in FIG. 8B from the point Ab upon the normal line Lb along the line of equal power Lp to the point Bb1 upon the lock line Lx, and then this cycle of the routine terminates. On the other hand, if the motor torque has not entered into the operating point changeover range R2, then the flow of control is transferred to a step S17, in which the ECU 30 does not change the operating point of the engine 3, but keeps the operating point upon the normal line Lb of FIG. 8B. And then this cycle of the routine terminates.

By the ECU 30 executing the control routine of FIG. 9, it is possible to obtain the same advantageous effects as in the case of the first embodiment. Moreover it is possible to suppress gear rattle noise without inviting deterioration of the fuel consumption, since the operating point of the engine is changed by individual methods that are adapted to all-cylinder operation and to partial cylinder operation. By the ECU 30 executing the step S12 of FIG. 9, the ECU 30 functions as the "change device" of the Claims.

The present invention is not limited to the various embodiments described above; various different forms of implementation are possible within the scope of the gist of the present invention. As the method of changing the operating point of the engine, the method of changing over the differential mechanism described above from its differential state to its non-differential state, and the method of changing the operating point on the normal line along the gear rattle noise suppression line, are not to be considered as being limitative. For example, when changing the operating point of the engine, it would also be possible to employ a method of shifting the operating point of the engine towards the high rotational speed low torque side by just a predetermined change amount.

In the embodiments described above, the power split mechanism 6, which functions as the "differential mechanism" of the Claims, is changed over from its differential state to its non-differential state by locking the first motor-generator 4, which functions as the "first electric motor", by locking the motor locking mechanism 25. However, the lock device that changes over the differential mechanism from its differential state to its non-differential state is not limited to being one which prevents the rotation of the first electric motor itself. For example, it would also be possible to interpose a clutch in the power transmission path from the differential mechanism to the first electric motor, to provide a lock device that can fix an element on the side of this clutch towards the differential mechanism, and to change over the differential mechanism from its differential state to its non-differential state with this lock device.

The engine that is the subject for application of the present invention is not limited to being an engine that can change over between partial cylinder operation and all-cylinder operation. In other words, the engine is not to be considered as being limited to performing partial cylinder operation as high torque fluctuation operation, and to performing full-cylinder operation as low torque fluctuation operation. The present invention can be applied to any engine which is capable of performing at least two types of operation during which the levels of torque fluctuation are different. For example, it would also be possible to take, as a subject for application of the present invention, an engine that is provided with a supercharger and that is capable of performing both high supercharging pressure operation in which the supercharging pressure is high and low supercharging pressure operation in which the supercharging pressure is low, or an engine that is capable of performing both lean combustion and stoichiometric combustion by changeover of its target air/fuel ratio.

With these engines, the level of fluctuation of the output torque changes due to changing over of the operational state. In concrete terms, in the case of an engine for which the supercharging pressure can be varied, the fluctuations of the output torque are greater during high supercharging pressure operation as compared to during low supercharging pressure operation. Accordingly, when this engine is performing high supercharging pressure operation which is high torque fluctuation operation, the predetermined range for the torque of the second electric motor can be set to be wider, as compared to when this engine is performing low supercharging pressure operation which is low torque fluctuation operation. And, in the case of an engine that is capable of performing both lean combustion operation and stoichiometric combustion operation, the fluctuations of the output torque are greater during lean combustion operation as compared to during stoichiometric combustion operation. Accordingly, when this engine is performing lean combustion operation which is high torque fluctuation operation, the predetermined range for the torque of the second electric motor can be set to be wider, as compared to when this engine is performing stoichiometric combustion operation which is low torque fluctuation operation.

The invention claimed is:

1. A control device for a hybrid vehicle, that is applied to a hybrid vehicle comprising:
    an engine that is capable of performing high torque fluctuation operation in which fluctuation of the output torque is high and low torque fluctuation operation in which fluctuation of the output torque is low, the engine comprising a plurality of cylinders and being capable of performing, as the high torque fluctuation operation, partial cylinder operation in which some among the plurality of cylinders are deactivated while the remaining ones of the cylinders operate, and, as the low torque fluctuation operation, all-cylinder operation in which all of the plurality of cylinders operate;
    a first electric motor;
    an output unit that transmits torque to drive wheels;
    a differential mechanism that distributes torque of the engine to the first electric motor and the output unit;
    a second electric motor that is linked to the output unit via a gear;
    a lock device that is capable of changing over the state of the differential mechanism from a differential state in which it distributes the torque of the engine to the first electric motor and to the output unit to a non-differential state in which it stops this distribution; and a change device that changes an operating point of the engine while the differential mechanism remains in the differential state;

wherein the control device causes the engine to execute the all-cylinder operation and the partial cylinder operation and, during the all-cylinder operation, changes the operating point of the engine with the change device when the torque of the second electric motor is within the predetermined range, and, during the partial cylinder operation, changes the operating point of the engine by operating the lock device when the torque of the second electric motor is within the predetermined range so that the state of the differential mechanism is changed over from the differential state to the non-differential state; and wherein the predetermined range is set to be wider when the engine is executing the partial cylinder operation, as compared to when the engine is executing the all-cylinder operation.

2. The control device according to claim 1 that further, when the operating point of the engine is changed by the state of the differential mechanism being changed over from the differential state to the non-differential state, controls the hybrid vehicle so that the drive force required by the driver is outputted by totaling the sum of the torque of the engine and the torque of the second electric motor.

3. A control device for a hybrid vehicle, that is applied to a hybrid vehicle comprising:

an engine that is capable of performing high torque fluctuation operation in which fluctuation of the output torque is high and low torque fluctuation operation in which fluctuation of the output torque is low;

a first electric motor;

an output unit that transmits torque to drive wheels;

a differential mechanism that distributes torque of the engine to the first electric motor and the output unit; and a second electric motor that is linked to the output unit via a gear;

wherein the control device causes the engine to execute the high torque fluctuation operation and the low torque fluctuation operation, and changes an operating point of the engine when the torque of the second electric motor is within a predetermined range; and wherein the predetermined range is set to be wider when the engine is executing the high torque fluctuation operation, as compared to when the engine is executing the low torque fluctuation operation.

4. The control device according to claim 3, further comprising a lock device that is capable of changing over the state of the differential mechanism from a differential state in which it distributes the torque of the engine to the first electric motor and to the output unit to a non-differential state in which it stops this distribution; and that, if the torque of the second electric motor is within the predetermined range, changes the operating point of the engine by operating the lock device so that the state of the differential mechanism is changed over from the differential state to the non-differential state.

5. The control device according to claim 4 that further, when the operating point of the engine is changed by the state of the differential mechanism being changed over from the differential state to the non-differential state, controls the hybrid vehicle so that the drive force required by the driver is outputted by totaling the sum of the torque of the engine and the torque of the second electric motor.

* * * * *